United States Patent
Ward et al.

(10) Patent No.: US 10,217,109 B2
(45) Date of Patent: Feb. 26, 2019

(54) APPARATUS AND METHOD FOR COMBINING CRYPTOGRAMS FOR CARD PAYMENTS

(75) Inventors: Michael C. Ward, Northants (GB); Patrik Smets, Belgium (BE); Paul Vanneste, Belgium (BE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1486 days.

(21) Appl. No.: 12/833,059

(22) Filed: Jul. 9, 2010

(65) Prior Publication Data

US 2012/0011070 A1 Jan. 12, 2012

(51) Int. Cl.
*G06Q 20/40* (2012.01)
*G06Q 20/20* (2012.01)
(Continued)

(52) U.S. Cl.
CPC .............. *G06Q 20/40* (2013.01); *G06Q 20/20* (2013.01); *G06Q 20/34* (2013.01);
(Continued)

(58) Field of Classification Search
CPC .................. G06Q 20/40; G06K 19/073; G06K 19/06187; H04L 9/00
(Continued)

(56) References Cited

U.S. PATENT DOCUMENTS 5,892,211 A * 4/1999 Davis et al. ................... 235/380
6,484,182 B1 * 11/2002 Dunphy et al. ............... 700/231
(Continued)

FOREIGN PATENT DOCUMENTS

WO    WO 0060012538 A2    2/2006
WO    WO 010033944 A2     3/2010

OTHER PUBLICATIONS

"Normally." Webster's Third New International Dictionary, Unabridged, Merriam-Webster, Incorporated, 1993. [online][retrieved on Mar. 21, 2012]. Retrieved from: <http://lionreference.chadwyck.com/searchFulltext.do?id=23348953&idType=offset&divLevel=2&queryId=../session/1332365687_23498&area=mwd&forward=refshelf&trail=refshelf>.*

(Continued)

*Primary Examiner* — Rutao Wu
*Assistant Examiner* — Monica A Mandel
(74) *Attorney, Agent, or Firm* — Otterstedt, Ellenbogen & Kammer, LLP

(57) ABSTRACT

At least a first cryptogram and a second cryptogram are transmitted from a payment device reader component to a terminal component. A message including at least the first cryptogram and the second cryptogram is transmitted from the terminal component to an issuer of a payment device presented to the reader component, through a payment network. A message is obtained from the issuer, corresponding to authentication, by the issuer, of the payment device (and optionally the owner of the payment device) presented to the reader component, based at least on the first cryptogram and the second cryptogram. The payment network is configured in accordance with at least one of (i) a standard, and (ii) a specification, which normally employs only a single cryptogram for the message and the authentication. Apparatuses and computer program products are also disclosed.

27 Claims, 6 Drawing Sheets

(51) Int. Cl.
*G06Q 20/34* (2012.01)
*G06Q 20/38* (2012.01)
*G07F 7/10* (2006.01)
*H04L 9/32* (2006.01)

(52) U.S. Cl.
CPC ....... *G06Q 20/3823* (2013.01); *G06Q 20/401* (2013.01); *G06Q 20/4012* (2013.01); *G07F 7/1016* (2013.01); *H04L 9/3242* (2013.01); *H04L 2209/56* (2013.01)

(58) Field of Classification Search
USPC .......................................................... 705/72
See application file for complete search history.

(56) References Cited

U.S. PATENT DOCUMENTS

| | | | | |
|---|---|---|---|---|
| 6,961,858 | B2 * | 11/2005 | Fransdonk | 726/29 |
| 7,020,635 | B2 * | 3/2006 | Hamilton et al. | 705/51 |
| 7,080,049 | B2 * | 7/2006 | Truitt et al. | 705/75 |
| 7,090,128 | B2 * | 8/2006 | Farley et al. | 235/384 |
| 7,107,462 | B2 * | 9/2006 | Fransdonk | 713/193 |
| 7,150,045 | B2 * | 12/2006 | Koelle et al. | 726/26 |
| 7,334,126 | B1 * | 2/2008 | Gilmore et al. | 713/168 |
| 7,395,244 | B1 * | 7/2008 | Kingsford | 705/52 |
| 7,523,071 | B2 * | 4/2009 | Fox et al. | 705/52 |
| 7,587,502 | B2 * | 9/2009 | Crawford et al. | 709/229 |
| 7,711,586 | B2 * | 5/2010 | Aggarwal et al. | 705/5 |
| 2002/0174332 | A1 * | 11/2002 | Vialen et al. | 713/152 |
| 2005/0033960 | A1 * | 2/2005 | Vialen et al. | 713/170 |
| 2005/0119978 | A1 | 6/2005 | Ates | |
| 2006/0022033 | A1 * | 2/2006 | Smets et al. | 235/380 |
| 2007/0118483 | A1 * | 5/2007 | Hill et al. | 705/64 |
| 2007/0215697 | A1 | 9/2007 | Ward | |
| 2007/0278291 | A1 * | 12/2007 | Rans et al. | 235/380 |
| 2009/0103730 | A1 | 4/2009 | Ward | |

OTHER PUBLICATIONS

"Chip Terms Explained: A Guide to Smart Card Terminology." Visa 2002.

MasterCard PayPass Mag Stripe, Acquirer Impelmentation Requirements,. 2006. [retrieved on Nov. 16, 2011] Retrieved from the internet: http://www.paypass.com/pdf/public_document.

PayPass-M/Chip Technical Specs. Sep. 2005. [retrieved on Nov. 16, 2011]. Retrieved from https//read.pudn.com/downloads161/doc/725864/PayPass%20-%20MChip%20(V1.3).pdf>.

MasterCard® PayPass™ Terminal Implementation Requirements, MasterCard Worldwide 2007.

\* cited by examiner

APPARATUS AND METHOD FOR COMBINING CRYPTOGRAMS FOR CARD PAYMENTS

FIELD OF THE INVENTION

The present invention relates generally to the electronic and computer arts, and, more particularly, to apparatus and methods for electronic payment.

BACKGROUND OF THE INVENTION

Devices, such as electronic devices, and particularly electronic payment devices (for example, so-called "smart cards") may be useful for a variety of payment and other applications. In some instances, such cards or other devices are used in conjunction with existing payment card networks with messaging capabilities appropriate for magnetic stripe cards.

One example of a specification that allows chip payments (in particular, contactless chip payments) to use authorization networks (proprietary and shared) that presently support magnetic stripe authorizations for credit or debit applications is the well-known MasterCard PayPass® Mag Stripe specification, available from MasterCard International Incorporated of Purchase, New York, USA.

SUMMARY OF THE INVENTION

Principles of the invention provide techniques for combining cryptograms for card payments. In one aspect, an exemplary method includes the steps of: facilitating transmitting, from a payment device reader component to a terminal component, at least a first cryptogram and a second cryptogram; facilitating transmitting, from the terminal component to an issuer of a payment device presented to the reader component, through a payment network, a message including at least the first cryptogram and the second cryptogram; and obtaining a message from the issuer, the message corresponding to authentication, by the issuer, of the payment device presented to the reader component, based at least on the first cryptogram and the second cryptogram. The payment network is configured in accordance with at least one of: (i) a standard, and (ii) a specification, which normally employs only a single cryptogram for the message and the authentication.

In another aspect, a terminal-reader apparatus for use with a payment device issued by an issuer, and with a payment network, includes a memory storing a reader module and a terminal module; and at least one processor, coupled to the memory. The at least one processor is operative to implement at least a portion of a reader component and a terminal component by executing the reader module and the terminal module, and to carry out or otherwise any one, some, or all of the method steps described herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects; for example:
enhanced security
minimal costs with good efficiency
These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
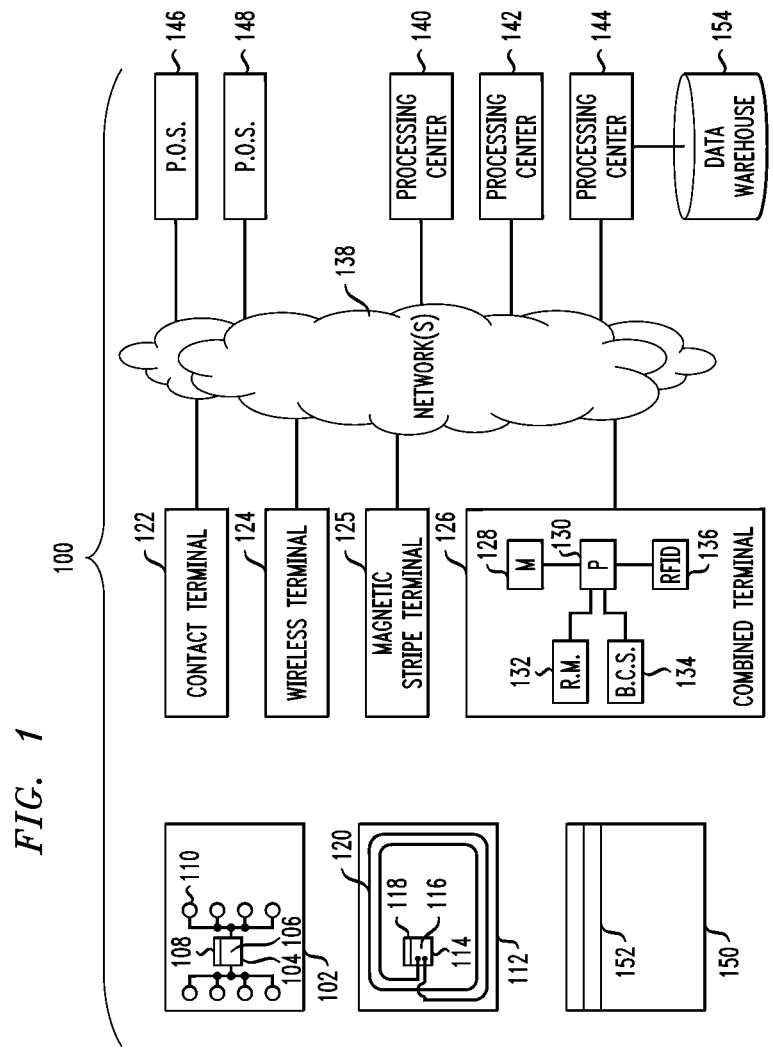
FIG. 1 shows an example of a system and various components thereof that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 June 2008

EMV Integrated Circuit Card Specifications for Payment Systems Book 2 Security and Key Management Version 4.2 June 2008

EMV Integrated Circuit Card Specifications for Payment Systems Book 3 Application Specification Version 4.2 June 2008

EMV Integrated Circuit Card Specifications for Payment Systems Book 4 Cardholder, Attendant, and Acquirer Interface Requirements Version 4.2 Jun. 2008

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

Figure 2:
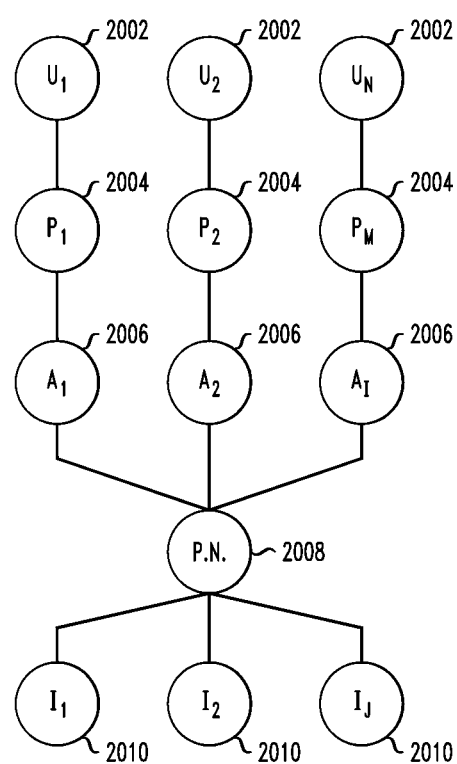
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer, such as the AMERICAN EXPRESS network (mark of American Express Company) (it being appreciated that the latter is a non-limiting example of a proprietary or closed payment network).

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

Giving attention now to FIG. 3, an example will be given of a standard transaction. In a normal transaction, in a zeroth step (not illustrated), the reader 132 and card 112 (understood to include other kinds of devices, as well), establish communications. Note that reader 132 was discussed somewhat generically above, but in the context of FIGS. 3-5 includes at least a contactless reader. In other cases, a contact reader can be provided. In a first step 301, the SELECT (PPSE) command allows the reader 132 to find out what payment applications the card has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from selecting Proximity Payment Systems Environment (PPSE). Step 306 includes the card responding to the select application command telling the reader the information that it needs for the transaction—AIP (Application Interchange Profile) tells the reader how to conduct the transaction, while AFL (application file locator) tells the reader what records need to be read from the card in order to conduct the transaction. It may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" The various commands and arguments are familiar to the skilled artisan from the EMV, PAYPASS® M/CHIP® & PAYPASS® MAGSTRIPE standards (registered marks of MasterCard International Incorporated, Purchase, New York, USA).

In steps 307 (representing "n" READ RECORD commands), a large amount of data is read from the card, using the series of READ RECORD commands, in a manner well-known in the art. Step(s) 308 show(s) return of the records that have been read.

In step 317, the reader provides an unpredictable number (UN) and asks the card to compute a cryptographic checksum. In step 318, the card responds with the track 1 CVC3 (optional), the track 2 CVC3, and the Application Transaction Counter (ATC).

The process just described will now be reiterated and summarized. There is an initial exchange where the card and reader work out how to communicate and establish communication. Then, the application is selected at 303, wherein a "SELECT" command is sent from the reader to the card, giving the card the identity of the application the reader wants to select. The reader gets a response from the card at block 304 that says (the terms "say," "talk," and the like being understood to contemplate electronic communication), in essence, "here is a brief description of the card." The reader then sends the "GET PROCESSING OPTIONS" command to the card in step 305. This is, in colloquial terms, the reader saying to the card "I would like to conduct a transaction; let us work out the details of how we should proceed"; the reader says to the card "if you asked for any details to determine how we should communicate, here are those details," and the card says to the reader, in step 306, "here is the information that you need in order to know how to proceed with the transaction." The information basically tells the reader what to read from the card and what the context of the transaction is.

In step(s) 307, the reader takes from the card all of the information it needs, via a series of instructions called "READ RECORD." The data obtained includes the primary account number (PAN), expiry date, and track data. In some instances, the data obtained may also include a series of public key certificates that allow verification of the authenticity of the card's data and encryption of data sent to the card (e.g. a PIN entered into the reader by the cardholder for verification by the card).

In step 317, the reader provides an unpredictable number (UN) and asks the card to compute a cryptographic checksum.

Figure 3:
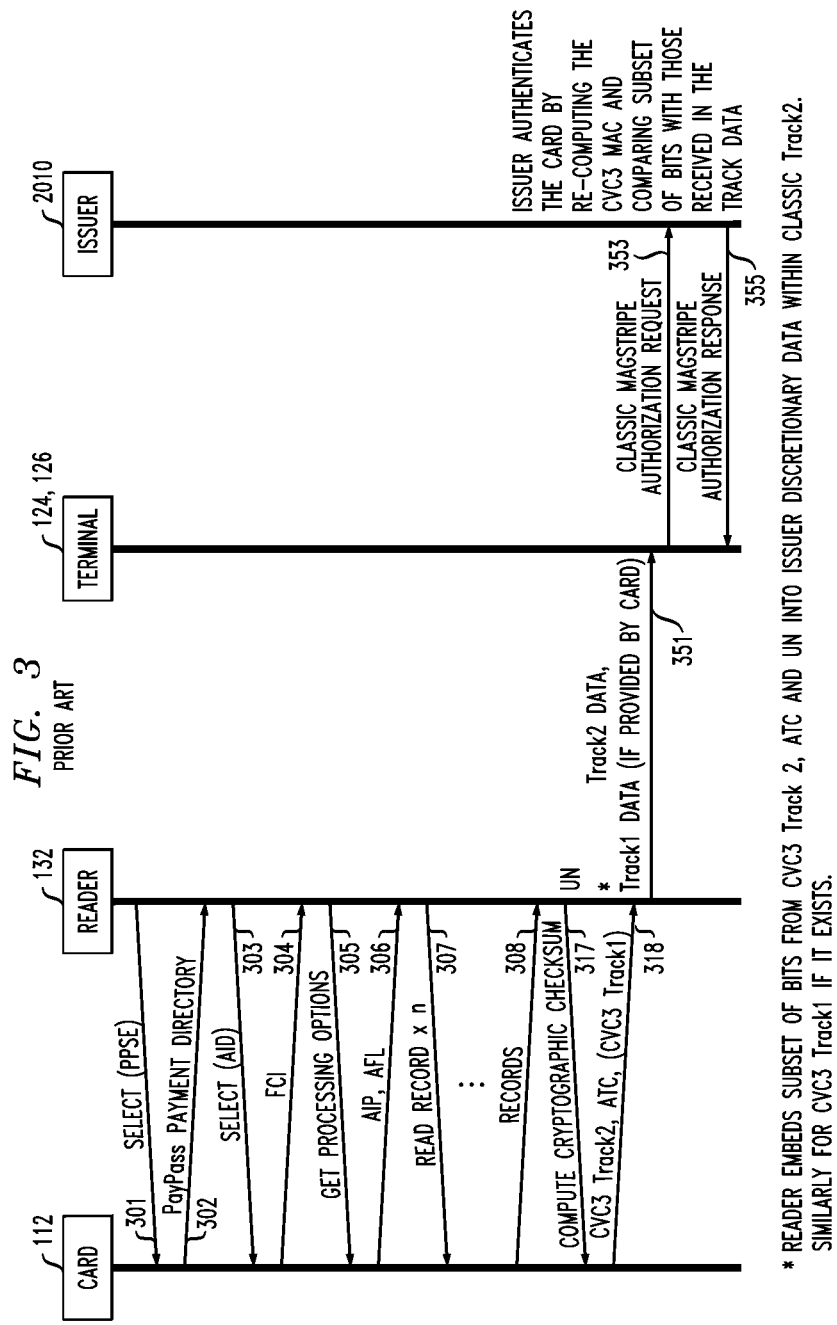
FIG. 3 is a message flow diagram depicting prior art techniques.

Still with reference to FIG. 3, currently, as shown at 318, a contactless card 112 will provide to the reader 132 two cryptograms; namely, two two-byte cryptograms. One of these is the track 1 CVC3 and the other is the track 2 CVC3. The first of these is optional and it depends on whether the issuer has advised the operator of the payment network 2008 to send it or not. The second of these is mandatory. The reader receives these cryptograms from the card along with the transaction counter (ATC)) and it will embed bits from the cryptograms and the ATC and UN into the track 1 and track 2 data that it will then provide to the terminal 124, 126, as shown at 351. Thus, there are at least three entities in FIG. 3; namely, the card 112; the reader 132; and the terminal 124, 126 (and ultimately, the issuer 2010).

The reader will provide the track 1 and track 2 data to the terminal and the terminal will send the track 2 data, and the track 1 data if provided, to the issuer 2010, as shown at 353, within a conventional magnetic stripe authorization request. One of the constraints in current systems is that when the CVC3 cryptogram is embedded in the track 1 and track 2 data elements, only certain bits are included, and thus, data is lost. This means that when the issuer 2010 carries out verification, the issuer has far fewer bits of security (as compared to the complete cryptogram(s)) with regard to authenticating the card.

The conventional magnetic stripe authorization response is depicted at 355. Note "Classic Magstripe" is intended as a non-limiting example of conventional magnetic stripe messaging.

Note also that examples are provided in the context of a contactless transaction but in other instances, embodiments may be implemented in the context of a contacted transaction.

Figure 4:
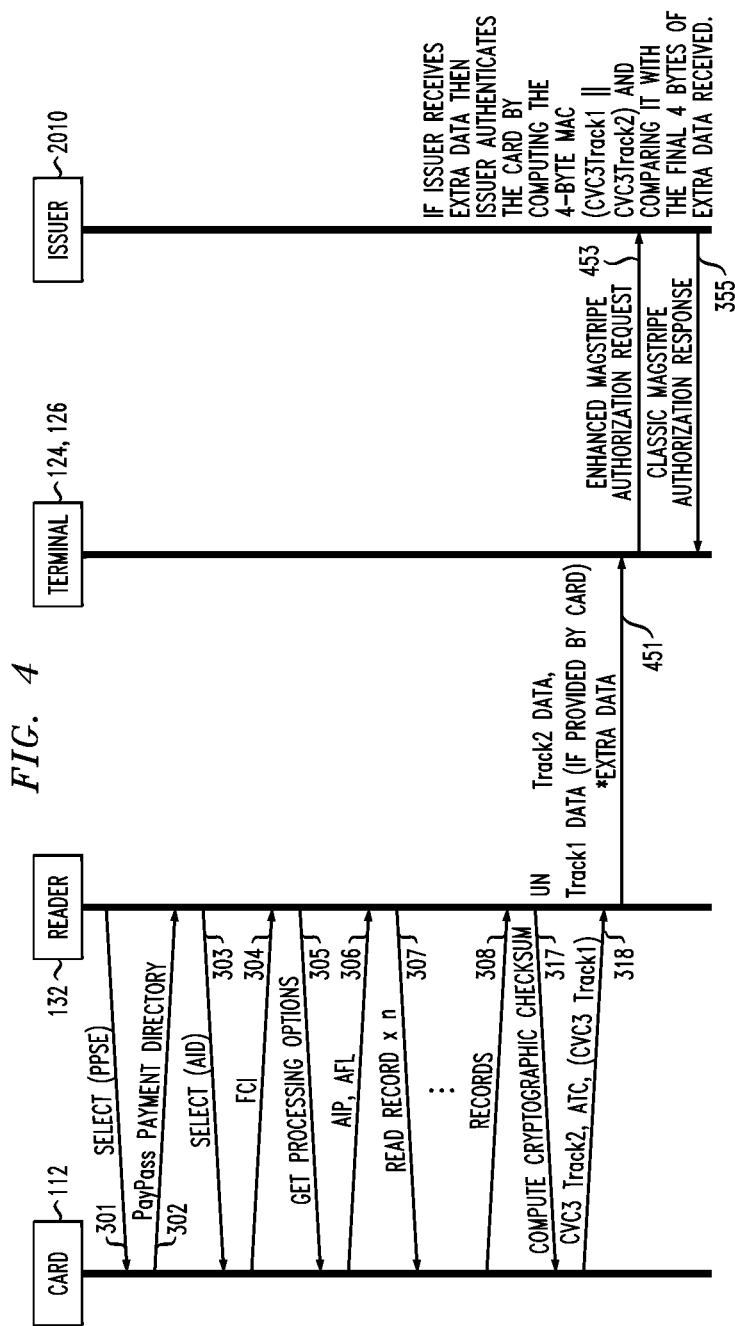
FIG. 4 is an exemplary message flow diagram according to an aspect of the invention.

Reference should now be had to FIG. 4, wherein elements similar to those in FIG. 3 have received the same reference character. In one or more embodiments of the invention, additional bytes of data payload are employed. For example, ten additional bytes of data payload can be provided in the authorization request 453 from the terminal 124, 126 to the issuer 2010; in such cases, it is not necessary to selectively include bits from the CVC3 in the track data; rather, the entire two bytes can be included. Therefore, since the issuer receives both full CVC3s (two bytes each), there is four-bytes worth of MAC (or, in effect, two separate two-byte MACs). The request with additional bytes of data is referred to herein as an "enhanced Magstripe authorization request."

In the context of an exemplary specification, such as that for MasterCard PayPass® Mag Stripe products and services, not only would the expanded cryptograms be available, but the additional information needed to verify those cryptograms with full security would also be present (e.g., unpredictable number (UN) and application transaction counter (ATC))—see "extra data" at message 451 in FIG. 4. Thus, when at least an extra ten bytes are available, rather than sending selected bits from the CVC3 cryptograms, it is possible to send two pairs of CVC3s, two bytes each along with the full UN and ATC. Thereby the issuer 2010, if it wishes, can verify two separate two-byte MACs (Message Authentication Codes) which provide, in effect, security approaching that of a four-byte MAC (i.e., security comparable to an EMV chip- and PIN-based transaction). The MasterCard PayPass® M/Chip application uses eight-byte cryptograms for the authorization request. Four-byte cryptograms are generally considered acceptable in the context of EMV.

Thus, in the current techniques of FIG. 3, the reader 132 embeds a subset of bits from CVC3 Track 2, ATC and UN into Issuer Discretionary Data within the "classic" Track2 (and similarly for CVC3 Track 1 if it exists). Issuer 2010 authenticates the card by re-computing the CVC3 MAC and comparing a subset of bits with those received in the Track data.

In a non-limiting exemplary embodiment, as in FIG. 4, extra data, including UN, ATC, CVC3 Track1, and CVC3 Track2 is provided from the reader 132 to the terminal 124, 126, as at 451. In request 453, the extra data may get embedded in an existing authorization message element or may be a new element (or may even be a separate message). When issuer 2010 receives the extra data then issuer 2010 authenticates the card by computing the 4-byte MAC (CVC3 Track1∥CVC3 Track2) and comparing it with the final 4 bytes of extra data received.

To summarize, one or more embodiments employ a small amount of extra bandwidth in authorization messages, and send and verify two 2-byte cryptograms instead of one. The invention thus provides techniques for increasing the security of contactless (or contact) transactions which:

requires no changes to the card application (in the ideal case where enough extra bytes are provided to include the 4-byte UN then the card should be personalized with a data element that informs the reader that the issuer also supports the full UN), is compatible with the existing transaction flow, and requires minimal changes on the terminal back-end, acquirer and issuer systems.

Specifically in one or more embodiments, the authorization message is extended and includes both 2-byte CVC3 values that are already communicated to the contactless reader 132 from the contactless card 112. Both CVC3 values are then verified by the issuer 2010 similar to the verification of a 4-byte MAC. As noted, in one or more embodiments, the extension is ten bytes, enabling both CVC3 values, the 2-byte ATC, and the 4-byte Unpredictable Number to be sent to the issuer 2010, further increasing security of the transaction.

As noted, in today's contactless magnetic stripe transactions the card 112 provides two 2-byte cryptograms, namely, $CVC3_{TRACK1}$ (optional) and $CVC3_{TRACK2}$ to the contactless reader 132. The contactless reader then embeds an issuer-defined subset of $CVC3_{TRACK1}$ (if received) and $CVC3_{TRACK2}$ into the Discretionary Data fields of the Track 1 Data and Track 2 Data fields respectively and sends these to the terminal 124, 126. The terminal then transmits one or the other of the Track Data to the issuer 2010 as part of the authorization request message 353.

The CVC3 cryptogram is used by the issuer 2010 to authenticate the card and hence the transaction. Because the CVC3 received by the issuer cannot have more than $2^{16}$ (=65536) possible values, the chances that a fraudster could randomly guess a value that would be accepted as a valid cryptogram by the issuer cannot be less than 1 in 65536, and in practice will be much higher than 1 in 65536. This is because, when embedded in the Track data, on average only 3 or 4 digits of the CVC3 can be sent to the issuer (i.e. only a part of the two byte CVC3).

In accordance with one or more embodiments, the authorization message is expanded to allow conveyance of both 2-byte CVC3 values and the issuer verifies both values, thus, in a sense, increasing the security level to 4-bytes (i.e. the probability of randomly guessing two valid cryptograms is $2^{32}$), comparable to the 4-byte MACs defined in EMV.

The skilled artisan will appreciate that the CVC3 (card verification code) is a cryptographic checksum also known as a MAC. Typically, with a normal magnetic stripe transaction, it is a static three digits. In EMV, dynamic cryptographic checksums are employed due to their greater strength and the fact that they are not subject to replay attacks. In current PayPass® Mag Stripe products and services (see, e.g., FIG. 3), only selected bits from the CVC3 can be employed, inasmuch as additional data needs to be provided to the issuer, such as bits from the unpredictable number and the application transaction counter.

The skilled artisan will also appreciate that the application transaction counter (ATC) is a counter in the chip card, two bytes long, which increments every transaction, and is a fundamental security mechanism employed with both contacted and contactless chips. It is one wherein the card and issuer, by including the ATC in the cryptogram calculation, can ensure that a cryptogram (and associated data) validated by the issuer is not simply a copy of data used for another transaction. The ATC can also be helpful for low-level cryptographics, such as key derivation, and could in principle be used for detecting card clones irrespective of cryptography.

In addition, the skilled artisan will appreciate that the unpredictable number is a four-byte number which provides a way for the terminal to ensure that the transaction is not replayed but rather is fresh. It is part of what is known as a challenge and response protocol, wherein the terminal sends an unpredictable number to the card, and the card will include that number in its cryptogram, which is sent to the issuer. In parallel with that, the terminal sends the unpredictable number to the issuer, and the issuer uses same as part of verifying the cryptogram.

The ARQC is the EMV authorization request cryptogram, which is included in the authorization request sent to the issuer.

It should be noted that ten additional bytes of data payload in the authorization request from the terminal to the issuer would be ideal, since the same is sufficient to include a two-byte ATC, a four-byte unpredictable number, and two two-byte CVC3s. However, lesser amounts can also be employed. The authorization request may conform, for example, to the ISO 8583 standard (proprietary sub-elements may also be included in some cases, as will be appreciated by the skilled artisan). Additional bytes may also be available via another channel, in some embodiments.

By way of example, with respect to use of lesser amounts, if the issuer only receives an extra 4 bytes then these extra 4 bytes could comprise the full CVC3track1 concatenated with the full CVC3track2. (Note that if binary-coded-decimal encoding is required then the encoded cryptograms should be truncated unless a 5th byte is available). The issuer will then authenticate the card by known techniques (e.g., the usual PayPass® method) except now the issuer will be able to check 4-bytes worth of MAC cryptogram, specifically by first calculating the issuer version of both 2-byte CVC3s and then comparing these to the ones received in the extra 4 bytes of the authorization message. Alternatively if the issuer receives an extra 6 bytes, say, then these extra 6 bytes could comprise the full CVC3track1 concatenated with the full CVC3track2 concatenated with the full 2-byte ATC. The full ATC enables the issuer to accurately determine the correct ATC. If an extra 10 bytes becomes available then, when all transactions support this capability, card applications can use the full 4-byte Unpredictable Number in their CVC3 calculation and the 10 bytes received by the issuer would comprise the full CVC3track1 concatenated with the full CVC3track2 concatenated with the full 2-byte ATC concatenated with the full 4-byte UN.

One or more embodiments may be implemented in the context of MasterCard PayPass® Mag Stripe products and services. The skilled artisan will appreciate that the same enables emulation of a magnetic stripe transaction with a chip card, with little or no impact on a magnetic-stripe payment card network (other than a small amount of extra data, such as the aforementioned ten bytes). Thus, in one or more embodiments, a contactless "smart" card interacts with a reader, but messaging within the payment network is analogous to that in a conventional transaction wherein a card with a magnetic strip is "swiped."

The PayPass® Mag Stripe specifications allow contactless chip payments to use authorization networks (proprietary and shared) that presently support magnetic stripe authorizations for credit or debit applications. The chip authentication process is performed between the chip embedded in the PayPass card 112 and the issuer 2010, which means that the additional functionality required in terminals to support PayPass® Mag Stripe specifications is minimal. There is also little impact on the acquirer host system, the authorization network and on other entities that may be involved in the transaction.

In the PayPass® Mag Stripe specifications, the card stores track 1 and track 2 data and a secret key for device authentication. Security is built around a dynamic Card Validation Code (CVC3) included in the discretionary data field of the track data. The CVC3 is generated by the card using a diversified secret key and the following input data:
The track data,
The Application Transaction Counter (ATC) of the card, and
The Unpredictable Number (UN) provided by the reader.

The general principle of operation is as follows: a card generates an authentication token for the issuer in the form of a dynamic CVC (CVC3). The CVC3, the UN and (part of) the ATC are sent to the issuer in the discretionary data fields of the track 1 and track 2 data, requiring little or no modification to the acquirer systems and the networks that are presently used for magnetic stripe card authorizations.

The PayPass® Mag Stripe specification considers the reader to be a peripheral device of the terminal. The reader performs the interaction with the card. It should be noted that in some instances, the terminal and reader are integrated into a single point-of-sale (POS) device while in others, they may be separate.

Figure 5:
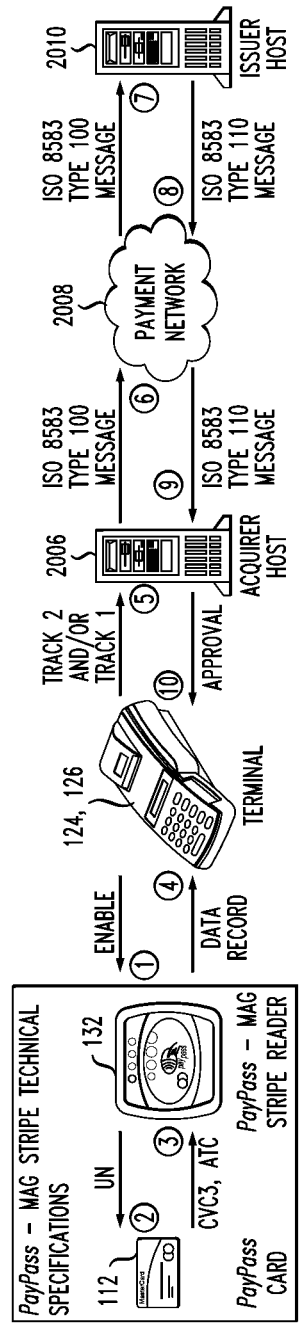
FIG. 5 is another message flow diagram depicting prior art techniques.

FIG. 5 gives a schematic overview of a transaction in accordance with the PayPass® Mag Stripe specification. In a first step indicated by encircled numeral 1, terminal 124, 126 enables reader 132. In a second step indicated by encircled numeral 2, reader 132 sends UN to card 112. In a third step indicated by encircled numeral 3, card 112 sends dynamic CVC3 and ATC to reader 132. In a fourth step indicated by encircled numeral 4, reader 132 sends Data Record to terminal 124, 126. In a fifth step indicated by encircled numeral 5, terminal 124, 126 sends authorization data to a host of acquirer 2006. In a sixth step indicated by encircled numeral 6, the host of acquirer 2006 sends an ISO 8583 type 100 message on payment network 2008 (e.g., the BANKNET network). In a seventh step indicated by encircled numeral 7, payment network 2008 forwards ISO 8583 type 100 message to issuer 2010. In an eighth step indicated by encircled numeral 8, issuer 2010 responds with an ISO 8583 type 110 message. In a ninth step indicated by encircled numeral 9, payment network 2008 forwards ISO 8583 type 110 message to acquirer 2006. In a tenth step indicated by encircled numeral 10, the host of acquirer 2006 informs terminal 124, 126 about the outcome of the transaction (e.g., approval).

Thus, a PayPass® Mag Stripe transaction can include the following operations. The terminal enables the reader, as at encircled numeral 1. The reader creates a list of applications that are supported by both the card and reader, as at 302. The reader picks the highest priority application from the list of mutually supported applications, and issues the SELECT command to select the application on the card, as at 303. The reader issues the GET PROCESSING OPTIONS command to initiate the transaction on the card, as at 305. The card updates the ATC. The reader issues the READ RECORD command to retrieve the static data from the card, as at 307. Amongst other data objects, the Track 1 Data (optional) and Track 2 Data and the bitmaps are returned. The bitmaps inform the reader where the CVC3, the ATC and the UN are to be located in the discretionary data fields of the Track 1 Data and Track 2 Data. The reader generates the UN and issues the COMPUTE CRYPTOGRAPHIC CHECKSUM command, in 317. The card returns the CVC3s for the Track 1 Data and Track 2 Data and the ATC, in 318.

Based on the bitmaps returned in the response 308 from the READ RECORD, the reader inserts the CVC3, (part of) the ATC and the UN in the discretionary data fields of the Track 1 Data and Track 2 Data. The reader copies the number of UN digits ($n_{UN}$) in the least significant position of the discretionary data fields of the Track 1 Data and Track 2 Data. The reader prepares a Data Record for the terminal. The Data Record includes the Track 1 Data (if present) and Track 2 Data including the dynamic CVC3 data. The Data Record also includes the discretionary data fields of the Track 1 Data (if present) and Track 2 Data as returned by the card (i.e. without UN, ATC, CVC3 and $n_{UN}$ included). The Data Record may also include PayPass Third Party Data (e.g. loyalty data returned by the card), card data for receipt printing (e.g. Application Label, Application Preferred Name and Issuer Code Table Index) and the cardholder's language preference (Language Preference).

The reader transfers the data objects of the Data Record required by the terminal to the terminal, as at 351. Depending on the product rules, the terminal may request the cardholder to enter his or her PIN for online PIN processing or offline PIN processing (in which case the PIN is entered and sent to the card before the reader issues the COMPUTE CRYPTOGRAPHIC CHECKSUM command). The terminal formats the authorization request as for a magnetic stripe transaction and sends the authorization request to the issuer, as at 353. Upon receipt of the authorization request, the issuer verifies the CVC3 and processes the authorization in a similar way to a magnetic stripe card authorization, as at 355. Depending on the product rules, the terminal prints a receipt with a line for cardholder signature.

Recapitulation

Given the discussion thus far, it will be appreciated that, in general terms, an exemplary method, according to an aspect of the invention, includes the step of facilitating transmitting, from a payment device reader component 132 to a terminal component 124, 126, at least a first cryptogram and a second cryptogram, as at step 451. The "reader component" and "terminal component" may be part of an integrated terminal assembly or may be separate. The part that processes data obtained through the reader interface to the payment device is the "reader component." The part which communicates to the acquirer is the "terminal component." If the terminal and reader are integrated, the reader component interrogates the payment device and the terminal component interfaces with the acquirer. The step just discussed may be carried out, for example, by software (broadly construed to include also firmware), referred to as a reader module, executing on a hardware processor of a reader component or integrated terminal assembly.

An additional step includes facilitating transmitting, from the terminal component to an issuer of a payment device presented to the reader component, through a payment network, a message including at least the first cryptogram and the second cryptogram, as at 453. The payment network could include the kind described with respect to FIG. 2, or a proprietary or closed payment network with only a single issuer and acquirer. The step just discussed may be carried out, for example, by software (broadly construed to include also firmware), referred to as a terminal module, executing on a hardware processor of a terminal component or integrated terminal assembly.

A further step includes obtaining a message from the issuer, as at 355; the message corresponds to authentication, by the issuer, of the payment device presented to the reader component, based at least on the first cryptogram and the second cryptogram. The step just discussed may be carried out, for example, by the aforementioned terminal module. The payment network is configured in accordance with a standard and/or a specification which normally employs only a single cryptogram for the message and the authentication, as described with respect to FIG. 3.

In some cases, an additional step includes the issuer authenticating the payment device presented to the reader component, based at least on the first cryptogram and the second cryptogram. Note that unless expressly stated to the contrary, an issuer should be understood to include an entity acting on behalf of an issuer, such as an issuer processor. Thus, it will be appreciated that this step may be carried out, for example, by an authentication software module running on a server of an issuer, an issuer processor, or even a server of the operator of the payment network.

In a preferred approach, as shown at 451, an unpredictable number and a transaction counter are also transmitted from the payment device reader component to the terminal component. The message 453 transmitted from the terminal component to the issuer preferably further includes the unpredictable number and the transaction counter. The authentication, by the issuer, of the payment device presented to the reader component, is preferably further based on the unpredictable number and the transaction counter.

It should be noted that in the general case, the payment device may be a contactless or a contacted device.

In some instances, in the step 453 of transmitting the message including the unpredictable number, the transaction counter, the first cryptogram, and the second cryptogram, the message is an authorization request message. The unpredictable number, the transaction counter, the first cryptogram, and the second cryptogram can be embedded in an existing message element of the authorization request message, or contained in a new message element of the authorization request message, or some combination thereof. In another approach, an authorization request message which is separate from, but associated with, the message including the unpredictable number, the transaction counter, the first cryptogram, and the second cryptogram, is transmitted from the terminal to the issuer through the payment network.

In some instances, the first cryptogram is a CVC3 Track 1 cryptogram and the second cryptogram is a CVC3 Track 2 cryptogram.

In one or more embodiments, in the authentication, the issuer authenticates the contactless payment device presented to the reader, based on the unpredictable number, the transaction counter, the first cryptogram, and the second cryptogram, by: running two message authentication code calculations; truncating output of each of the two message authentication code calculations to two bytes; and comparing the two truncated message authentication code calculation outputs to the first and second cryptograms. In this regard, with reference to the lower right-hand corner of FIG. 4, heretofore, a 4-byte MAC per se has been used (in EMV, for the response message back from issuer, and other secure script commands coming back from the issuer). In one or more embodiments, with respect to the two cryptograms, each is essentially a MAC truncated down to two bytes. Send the two separate 2-byte cryptograms at 453, and combine them at the issuer end. From a security perspective, treat them as an integrated 4-byte MAC. The combination is essentially a concatenation. The issuer, instead of running a single MAC algorithm and truncating the output down to 4 bytes (as, e.g., in EMV) runs two MAC calculations and truncates the output of each down to 2 bytes and compares the resultant pair of 2-bytes with the two CVC3s that were received. The issuer calculates the 2 MACs based on the card and terminal data (UN, ATC) received in the authorization request. The data protected by each cryptogram is the same, and thus the same as for standard PayPass® applications. However, a difference is that the assurance level increases.

In another aspect, the input data to the cryptographic calculations may have a bit which is on or off and the issuer does not know which. If the cryptogram fails, try again, with a variant of the input data. Thus, potentially, the two CVC3s verify correctly the first time, or the second time, or not at all. The latter case is an indication that the card is a fake. The two different ways to authenticate can be used to carry additional information. This is useful, e.g., when card does PIN verification. Success or failure of the PIN is protected by two CVC3s. When issuer receives them, it does not know if PIN verification was successful or failed. So, it tries to verify the CVC3s twice—one case corresponds to correct verification of the PIN, one corresponds to not successfully verifying the PIN. The PIN protects the cardholder from a lost or stolen card. The card knows its own PIN and can verify whether it was entered correctly at the terminal. The issuer may decline a transaction when the PIN was not entered correctly.

It will thus be appreciated that in some instances, an additional step involves including at least one additional bit as an input to a cryptographic calculation by the issuer, wherein: the first and second cryptograms verifying with the bit at a first logical level corresponds to a first condition (e.g., correct PIN entry); the first and second cryptograms verifying with the bit at a second logical level corresponds to a second condition (e.g., incorrect PIN entry); and the first and second cryptograms not verifying with the bit at the first logical level or the second logical level corresponds to a third condition (e.g., counterfeit payment device).

In another aspect, a terminal-reader apparatus for use with a payment device issued by an issuer, and with a payment network, includes a memory storing a reader module and a terminal module; and at least one processor, coupled to the memory. The at least one processor is operative to implement at least a portion of a reader component and a terminal component by executing the reader module and the terminal module, and to carry out or otherwise any one, some, or all of the method steps described herein. The reader component and the terminal component can be integrated or realized separately. In the latter case, there are at least two processors, at least one for the reader component and at least one for the terminal component. In the former case, the modules may run on the same processor(s), or there can be at least two processors, at least one for the reader component and at least one for the terminal component. The skilled artisan will appreciate from the context whether a "reader module," as used herein, is referring only to software and/or firmware encoded on a tangible computer-readable storage medium, or to a complete reader including contacts, antenna, and so on (the latter, for example, in discussion of FIG. 1 element 132).

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, a host, server, and/or processing center 140, 142, 144 (optionally with data warehouse 154) of a merchant, issuer, acquirer, processor, or operator of a network 2008 operating according to a payment system standard (and/or specification), and the like. Firmware might be employed, for example, in connection with payment devices such as cards 102, 112, as well as reader 132.

Figure 6:
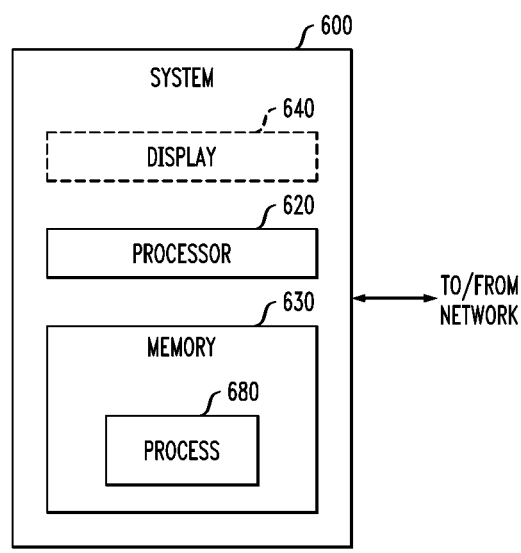
FIG. 6 is a block diagram of an exemplary computer system useful in one or more embodiments of the invention.

FIG. 6 is a block diagram of a system 600 that can implement part or all of one or more aspects or processes of the invention. As shown in FIG. 6, memory 630 configures the processor 620 (which could correspond, e.g., to processor portions 106, 116, 130; a processor of a reader 132; processors of remote hosts in centers 140, 142, 144; processors of hosts and/or servers implementing various functionality, and the like) to implement one or more aspects of the methods, steps, and functions disclosed herein (collectively, shown as process 680 in FIG. 6). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices (e.g., displays, printers, keyboards, mice, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium (non-transitory storage), examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 124, 126, 140, 142, 144, 132, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 124, 126, 140, 142, 144, 132, 2004, 2006, 2008, 2010, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 600 as shown in FIG. 6) running a server program. It will be understood that such a physical server may or may not include a display, keyboard, or other input/output components. A "host" includes a physical data processing system (for example, system 600 as shown in FIG. 6) running an appropriate program.

Furthermore, it should be noted that any of the methods described herein can include an additional step of providing a system comprising distinct software (broadly construed in this context to be inclusive also of firmware) modules embodied on one or more tangible computer readable storage media. All the modules (or any subset thereof) can be on the same medium, or each can be on a different medium, for example. The modules can include any or all of the components shown in the figures. In one or more embodiments, the modules include a reader module, a terminal module, and optionally an authentication module. The reader module could run on the processor(s) of a reader and the terminal processor could run on the processor(s) of a terminal. In the case of an integrated terminal assembly, the reader and terminal modules could run on the same or different processors. The authentication module could run on the server(s) of an issuer (broadly understood to also include an issuer processor) or on the server(s) of an operator of a payment network. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. Again, the skilled artisan will appreciate from the context whether a 'reader module" is referring to software and/or firmware stored in a non-transitory manner in a tangible storage medium, or to a complete reader with contacts, antennas, and so on.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, Assembler, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures. In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    obtaining, by a terminal component from a payment device reader component, at least a first cryptogram and a second cryptogram;
    transmitting, from said terminal component to an issuer of a payment device presented to said payment device reader component, through a payment network, said first cryptogram, said second cryptogram, and extra data, wherein at least said first cryptogram and said second cryptogram are transmitted in a first message; and
    obtaining, by said terminal, a second message from said issuer, said second message corresponding to authentication, by said issuer, of said payment device presented to said payment device reader component, said authentication being issued upon a first cryptographic calculation, wherein said first cryptographic calculation is selected from among a plurality of cryptographic calculations upon determining that said first message and said extra data have been obtained by said issuer, wherein said first cryptographic calculation comprises:
        running a first message authentication code calculation using said extra data;
        running a second message authentication code calculation using said extra data; and
        determining said authentication of said payment device by comparing a truncated portion of an output of each of said first and second message authentication code calculations to said first cryptogram and said second cryptogram.

2. The method of claim 1, wherein said extra data comprises an unpredictable number and a transaction counter, and wherein:
    said first message transmitted from said terminal component to said issuer further comprises said unpredictable number and said transaction counter; and
    said authentication, by said issuer, of said payment device presented to said reader component, is further based on said unpredictable number and said transaction counter.

3. The method of claim 2, wherein said payment device comprises at least one of a contactless payment device and a contacted payment device.

4. The method of claim 3, wherein, in said step of transmitting said first message comprising said unpredictable number, said transaction counter, said first cryptogram, and said second cryptogram, said first message comprises an authorization request message.

5. The method of claim 4, wherein said unpredictable number, said transaction counter, said first cryptogram, and said second cryptogram are embedded in an existing message element of said authorization request message.

6. The method of claim 4, wherein said unpredictable number, said transaction counter, said first cryptogram, and said second cryptogram are contained in a message element extending said authorization request message.

7. The method of claim 1, further comprising transmitting, from said terminal to said issuer through said payment network, an authorization request message which is separate from, but associated with, said first message comprising said first cryptogram, and said second cryptogram.

8. The method of claim 1, wherein said first cryptogram comprises a CVC3 Track 1 cryptogram and said second cryptogram comprises a CVC3 Track 2 cryptogram.

9. The method of claim 1, wherein, in said authentication, said issuer authenticates said payment device presented to said reader by:
    selecting said first cryptographic calculation upon determining that said first message includes said first cryptogram, said second cryptogram, and said extra data, wherein said extra data comprises an unpredictable number, a transaction counter; and
    selecting a second cryptographic calculation from among said plurality of cryptographic calculations upon determining that said first message includes insufficient data for performing said first cryptographic calculation.

10. The method of claim 1, further comprising including at least one additional bit as an input to said cryptographic calculation by said issuer, the method further comprising one of:
    determining a first condition upon verifying said first and second cryptograms and said bit has a first logical level;
    determining a second condition upon verifying said first and second cryptograms and said bit has a second logical level; and
    determining a third condition upon a failure to verify said first and second cryptograms and said bit has said first logical level or said second logical level.

11. The method of claim 10, wherein:
said first condition comprises a correct PIN entry;
said second condition comprises an incorrect PIN entry; and
said third condition comprises a counterfeit payment device.

12. The method of claim 1, further comprising providing a system comprising distinct software modules embodied on at least one tangible computer readable storage medium, said modules comprising a reader module and a terminal module, wherein:
said step of obtaining, by said terminal component from said payment device reader component, at least said first cryptogram and said second cryptogram, is carried out at least in part by said reader module executing on at least one hardware processor;
said step of transmitting, from said terminal component to said issuer of said payment device presented to said reader component, through said payment network, said first cryptogram, said second cryptogram, and said extra data, is carried out at least in part by said terminal module executing on said at least one hardware processor; and
said step of obtaining, by said terminal, said second message from said issuer, is carried out at least in part by said terminal module executing on said at least one hardware processor.

13. A non-transitory computer program product comprising a tangible computer readable recordable storage medium storing in a non-transitory manner computer usable program code executable on at least one hardware processor, the computer usable program code being configured to:
obtain, by a terminal component from a payment device reader component, at least a first cryptogram and a second cryptogram;
transmit, from said terminal component to an issuer of a payment device presented to said payment device reader component, through a payment network, said first cryptogram, said second cryptogram, and extra data, wherein at least said first cryptogram and said second cryptogram are transmitted in a first message; and
obtain, by said terminal, a second message from said issuer, said second message corresponding to authentication, by said issuer, of said payment device presented to said payment device reader component, said authentication being issued upon a first cryptographic calculation, wherein said first cryptographic calculation is selected from among a plurality of cryptographic calculations upon determining that said first message and said extra data have been obtained by said issuer,
wherein said first cryptographic calculation comprises:
running a first message authentication code calculation using said extra data;
running a second message authentication code calculation using said extra data; and determining said authentication of said payment device by comparing a truncated portion of an output of each of said first and second message authentication code calculations to said first cryptogram and said second cryptogram.

14. A terminal-reader apparatus for use with a payment device issued by an issuer, and a payment network, said apparatus comprising:
a memory storing a reader module and a terminal module; and
at least one processor, coupled to said memory, and operative to:
implement at least a portion of a reader component and a terminal component by executing said reader module and said terminal module:
obtain, by said terminal component from said reader module, at least a first cryptogram and a second cryptogram, upon presentation of the payment device to the reader component;
transmit, from said terminal component to the issuer of the payment device, through the payment network, said first cryptogram, said second cryptogram, and extra data, wherein at least said first cryptogram and said second cryptogram are transmitted in a first message; and
obtain, by said terminal, a second message from the issuer, said second message corresponding to authentication, by the issuer, of the payment device presented to said reader component, said authentication being issued upon a first cryptographic calculation, wherein said first cryptographic calculation is selected from among a plurality of cryptographic calculations upon determining that said first message and said extra data have been obtained by said issuer,
wherein said first cryptographic calculation comprises:
running a first message authentication code calculation using said extra data;
running a second message authentication code calculation using said extra data; and
determining said authentication of said payment device by comparing a truncated portion of an output of each of said first and second message authentication code calculations to said first cryptogram and said second cryptogram.

15. The apparatus of claim 14, wherein said extra data comprises an unpredictable number and a transaction counter, and wherein:
said first message transmitted from said terminal component to the issuer further comprises said unpredictable number and said transaction counter; and
in said second message corresponding to said authentication, by the issuer, of the payment device presented to said reader component, said authentication is further based on said unpredictable number and said transaction counter.

16. The apparatus of claim 15, wherein said reader component further comprises a payment device interface.

17. The apparatus of claim 15, wherein, when said at least one processor is operative to facilitate sending said first message comprising said unpredictable number, said transaction counter, said first cryptogram, and said second cryptogram, said first message comprises an authorization request message.

18. The apparatus of claim 17, wherein said unpredictable number, said transaction counter, said first cryptogram, and said second cryptogram are embedded in an existing message element of said authorization request message.

19. The apparatus of claim 17, wherein said unpredictable number, said transaction counter, said first cryptogram, and said second cryptogram are contained in a message element extending said authorization request message.

20. The apparatus of claim 15, wherein said at least one processor is further operative to transmit, from said terminal component to the issuer through the payment network, an authorization request message which is separate from, but associated with, said first message comprising said first cryptogram, and said second cryptogram.

21. The apparatus of claim 15, wherein said first cryptogram comprises a CVC3 Track 1 cryptogram and said second cryptogram comprises a CVC3 Track 2 cryptogram.

22. The apparatus of claim 14, wherein said reader component and said terminal component are integrated.

23. The apparatus of claim 22, wherein said at least one processor comprises a first processor and further comprises at least a second processor, said first processor being operative to implement said at least a portion of said reader component by executing said reader module and said second processor being operative to implement said at least a portion of said terminal component by executing said terminal module.

24. The apparatus of claim 14, wherein said reader component and said terminal component are realized separately, and wherein said at least one processor comprises a first processor and further comprises at least a second processor, said first processor being operative to implement said at least a portion of said reader component by executing said reader module and said second processor being operative to implement said at least a portion of said terminal component by executing said terminal module.

25. The method of claim 1, further comprising:
adding a bit to said first message indicating an inclusion of said first cryptogram and said second cryptogram; and
selecting a logic level of said cryptographic calculation according to said bit.

26. A method comprising the steps of:
receiving, by an issuer of a payment device, at least a first cryptogram, a second cryptogram, and extra data read from payment device by a payment device reader of a terminal component, wherein at least said first cryptogram and said second cryptogram are transmitted to said issuer in a first message through a payment network;
selecting, from among plurality of cryptographic calculations, a first cryptographic calculation for processing messages comprising a plurality of cryptograms upon determining that said first message and said extra data have been received by said issuer;
authenticating the payment device according to a combination of said first cryptogram and said second cryptogram; and
transmitting a second message corresponding to an authentication of the payment device to the terminal component via the payment network, wherein said authentication is an approval of a transaction using said payment device,
wherein said first cryptographic calculation comprises:
running a first message authentication code calculation using said extra data;
running a second message authentication code calculation using said extra data; and
determining said authentication of said payment device by comparing a truncated portion of an output of each of said first and second message authentication code calculations to said first cryptogram and said second cryptogram.

27. The method of claim 26, wherein, in said authentication, said issuer authenticates said payment device presented to said reader by:
selecting said first cryptographic calculation upon determining that said first message includes said first cryptogram, said second cryptogram, and said extra data, wherein said extra data comprises an unpredictable number, a transaction counter; and
selecting a second cryptographic calculation from among said plurality of cryptographic calculations upon determining that said first message includes insufficient data for performing said first cryptographic calculation.

* * * * *